Jan. 27, 1931.  C. C. FARMER  1,790,207
GASKET RETAINER
Filed June 17, 1927
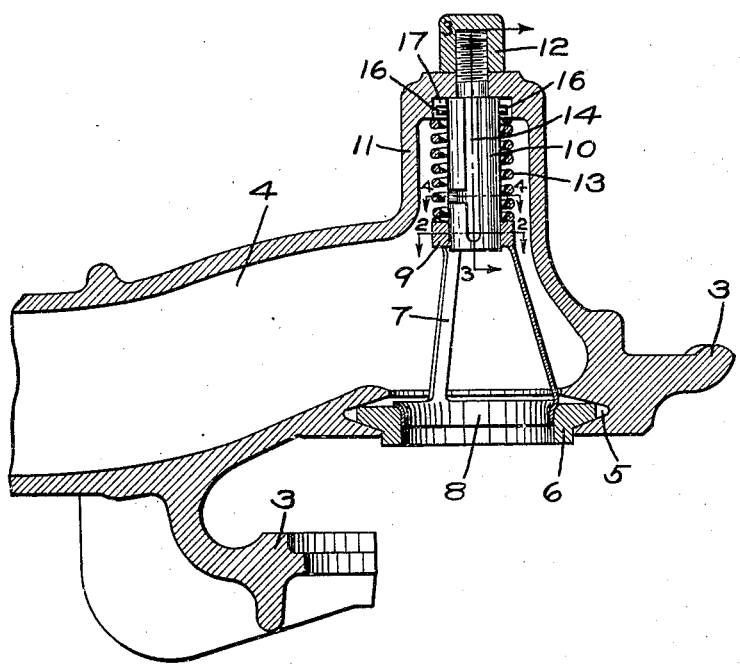
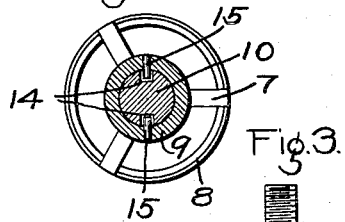
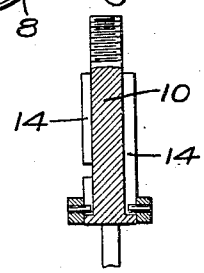
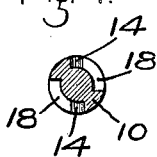
INVENTOR
CLYDE C FARMER
BY *Wm. M. Cady*
ATTORNEY Patented Jan. 27, 1931

1,790,207

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

GASKET RETAINER

Application filed June 17, 1927. Serial No. 199,505.

This invention relates to hose couplings, and more particularly to a gasket holding device.

The principal object of my invention is to provide an improved means for holding the gasket of a hose coupling in place.

In the accompanying drawing; Fig. 1 is a sectional view of a hose coupling, with my improvement applied thereto; Fig. 2 a section on the line 2—2 of Fig. 1; Fig. 3 a section on the line 3—3 of Fig. 1; and Fig. 4 a section on the line 4—4 of Fig. 1.

The coupling head 1, as shown in the drawing, is provided with the usual locking flanges 2 and 3 and the opening of the conduit 4 at the meeting face of the head is provided with the usual annular recess 5 for receiving the flange of the usual flexible gasket 6.

In order to hold the gasket 6 against a gasket of a counterpart coupling with uniform pressure and to assist in preventing leakage around the gasket, a pressure exerting member 7 is provided, which has a ring portion 8 having a concave face adapted to engage the inner rounded corner of the gasket.

Spaced from the portion 8 is a ring 9 which slidingly engages a stem 10. Said stem is provided at its outer end with a threaded extension which passes through a bore in the end wall of a hollow cylindrical extension 11 of the head 1 and is engaged by a nut 12 for clamping the stem in place.

Disposed in the chamber within the extension 11 is a coil spring 13 which engages the ring 9 at one end and the inner face of the end wall of the extension 11 at the other end. The stem 10 is provided with opposite longitudinal grooves 14 and engaging in said grooves are pins 15 which are secured to the ring 9. In order to prevent rotation of the stem 10, the stem is provided with pins 16 which are adapted to engage in corresponding recesses 17 cut in the end wall of the portion 11. Extending part way around the stem from the grooves 14 are recesses 18.

With the parts positioned as shown in the drawing, the member 7 is pressed into engagement with the gasket 6 by the pressure of the spring 13 and thus assures uniform compression of two engaging gaskets when counterpart coupling heads are coupled together, and also assists in maintaining the gasket in leak tight engagement with the outer wall of the recess in the coupling head.

If it is desired to remove a gasket and put in a new one, the member 7 is pushed inwardly against the pressure of the spring 13 until the pins 15 are in alinement with the recesses 18. The member 7 is then partially rotated so that the pins 15 engage in the recesses 18 and then when released, the member will be prevented from moving toward the gasket holding position, as will be evident. While the member 7 is so held, an old gasket may be removed and a new one put in, and then the member 7 is rotated so that the pins 15 again aline with the grooves 14, so that upon release of the member, the spring 13 will be free to press the member into engagement with the gasket.

Having now described my invention, what I claim as new and desire to secure by Letters Patent, is:—

1. The combination with a hose coupling head having a gasket disposed in a recess at the meeting face of the head, of a member engaging said gasket, a stem carried by said head on which said member is slidably mounted, a spring urging said member against said gasket, a pin carried by said member and normally engaging a longitudinal groove in said stem, said stem having an annular groove for receiving said pin upon a partial rotation of said member when said member is moved to a position away from said gasket.

2. The combination with a hose coupling head having a gasket in a recess at the meeting face of the head, of a member engaging said gasket, a spring pressing said member against said gasket, a stem carried by said head on which said member is slidably mounted and provided with a shoulder, and a projection carried by said member, for engaging said shoulder, upon a rotative movement of said member, after said member has been moved away from said gasket.

In testimony whereof I have hereunto set my hand.

CLYDE C. FARMER.